United States Patent
Choi et al.

(10) Patent No.: US 10,362,599 B2
(45) Date of Patent: Jul. 23, 2019

(54) METHOD FOR OBTAINING UPLINK SYNCHRONIZATION AND CONFIGURING UPLINK CONNECTION

(71) Applicant: LG Electronics Inc., Seoul (KR)

(72) Inventors: Hyeyoung Choi, Seoul (KR); Heejeong Cho, Seoul (KR); Jaehoon Chung, Seoul (KR); Genebeck Hahn, Seoul (KR); Eunjong Lee, Seoul (KR); Jinmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 15/033,213

(22) PCT Filed: Nov. 7, 2014

(86) PCT No.: PCT/KR2014/010670
§ 371 (c)(1),
(2) Date: Apr. 29, 2016

(87) PCT Pub. No.: WO2015/072703
PCT Pub. Date: May 21, 2015

(65) Prior Publication Data
US 2016/0262179 A1  Sep. 8, 2016

Related U.S. Application Data

(60) Provisional application No. 61/902,797, filed on Nov. 12, 2013.

(51) Int. Cl.
*H04W 74/00* (2009.01)
*H04W 76/10* (2018.01)
(Continued)

(52) U.S. Cl.
CPC ........ *H04W 74/004* (2013.01); *H04B 7/0608* (2013.01); *H04W 56/001* (2013.01);
(Continued)

(58) Field of Classification Search
CPC .............. H04W 74/004; H04W 76/10; H04W 72/0413; H04W 56/001; H04W 74/00; H04W 48/20; H04W 88/085
(Continued)

(56) References Cited

U.S. PATENT DOCUMENTS

2012/0300752 A1* 11/2012 Kwon ............... H04W 56/0005
370/336
2013/0072191 A1   3/2013 Jalloul et al.
(Continued)

FOREIGN PATENT DOCUMENTS

CN       102422568 A    4/2012
CN       102812762 A    12/2012
(Continued)

OTHER PUBLICATIONS

R1-120991—3GPP TSG RAN WG1 Meeting #68bis; Jeju, Korea, Mar. 26-30, 2012, Huawei, HiSilicon, Uplink timing advance for CoMP.
(Continued)

*Primary Examiner* — Kwang B Yao
*Assistant Examiner* — Syed M Bokhari
(74) *Attorney, Agent, or Firm* — Dentons US LLP

(57) ABSTRACT

Disclosed are a terminal, which receives a downlink signal from a plurality of RRHs, transmits a random access preamble to any one target RRH in which the intensity of the received downlink signal among the plurality of RRHs is greater than or equal to a threshold value, receives a random access response message indicating that an uplink connection to a selected RRH will be configured on the basis of difference of a reception power of a random access preamble received by the target RRH and a reception power of a random access preamble which is overheard by a neighborhood RRH adjacent to the target RRH, and configures an
(Continued)

uplink connection to the selected RRH, and an uplink connection configuration method thereof.

9 Claims, 9 Drawing Sheets

(51) Int. Cl.
   *H04B 7/06* (2006.01)
   *H04W 56/00* (2009.01)
   *H04W 72/04* (2009.01)
   *H04W 88/08* (2009.01)
   *H04B 7/022* (2017.01)
   *H04W 48/20* (2009.01)

(52) U.S. Cl.
   CPC ....... *H04W 72/0413* (2013.01); *H04W 74/00* (2013.01); *H04W 76/10* (2018.02); *H04B 7/022* (2013.01); *H04W 48/20* (2013.01); *H04W 88/085* (2013.01)

(58) Field of Classification Search
   USPC .................................................. 370/329, 281
   See application file for complete search history.

(56) References Cited

U.S. PATENT DOCUMENTS

| | | | |
|---|---|---|---|
| 2013/0231147 A1 | 9/2013 | Li et al. | |
| 2013/0294418 A1 | 11/2013 | Vukovic et al. | |
| 2014/0212129 A1* | 7/2014 | Huang | H04W 48/20 398/2 |
| 2014/0349667 A1* | 11/2014 | Hahn | H04W 76/10 455/452.1 |
| 2015/0304960 A1* | 10/2015 | Yang | H04B 15/00 370/252 |
| 2016/0081105 A1* | 3/2016 | Mizusawa | H04J 11/005 370/281 |

FOREIGN PATENT DOCUMENTS

| | | |
|---|---|---|
| KR | 10-2012-0088815 A | 8/2012 |
| WO | 2013/044957 A1 | 4/2013 |
| WO | 2013-048526 A1 | 4/2013 |
| WO | 2013044957 A1 | 4/2013 |
| WO | 2013062357 A2 | 5/2013 |
| WO | 2013/123670 A1 | 8/2013 |
| WO | 2013/125900 A1 | 8/2013 |
| WO | 2013/141508 A1 | 9/2013 |

OTHER PUBLICATIONS

R1-113042—3GPP TSG RAN WG1 Meeting #66bis; Zhuhai, China, Oct. 10-14, 2011, New Postcom, "RACH enhancement for uplink CoMP .".

New Postcom: "RACH enhancement for uplink CoMP", R1-113695, 3GPP TSG RAN WG1 Meeting #67, San Francisco, USA, Nov. 14-18, 2011.

* cited by examiner

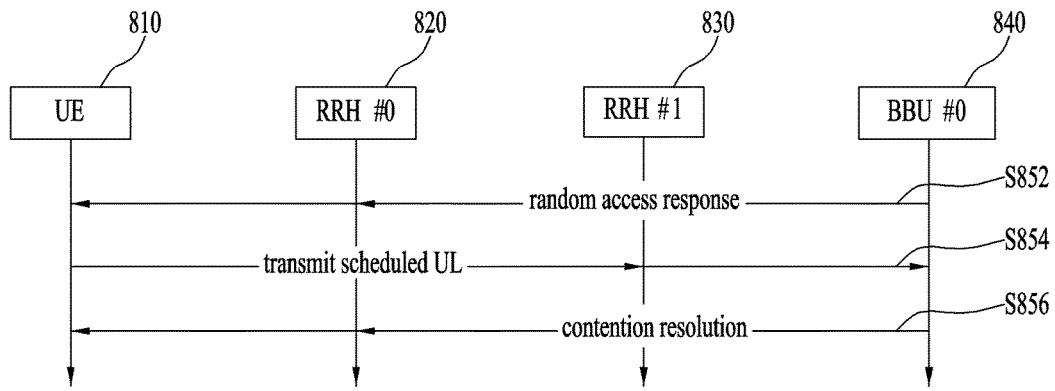
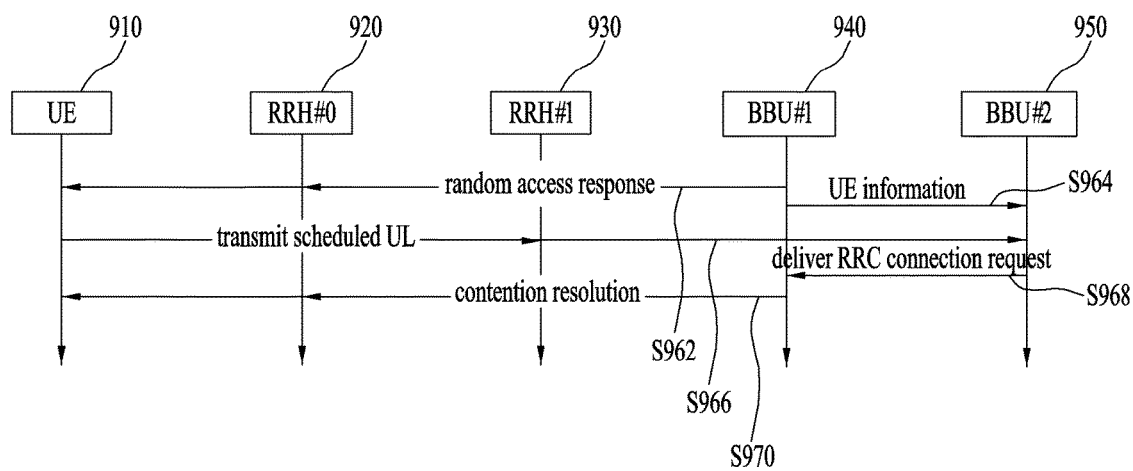

METHOD FOR OBTAINING UPLINK SYNCHRONIZATION AND CONFIGURING UPLINK CONNECTION

TECHNICAL FIELD

The present invention relates to a method of configuring an uplink connection among a terminal, an RRH and a BBU in environment the RRH and the BBU are separately implemented.

BACKGROUND ART

A radio access network (RAN) configuration has been changed such that various types of small cells such as a pico cell and a femto cell interact with a macro cell. The RAN configuration refers to a heterogeneous cell configuration or a hierarchical cell configuration in which small cells for low power/near field communication coexist in addition to an existing macro cell-based homogeneous network. An object of a new RAN configuration is to increase QoE (Quality of Experience) by providing a high data transfer rate to an end user.

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conducted to draw advantages of concept of dual connectivity to small cell layers and a macro cell layer in which a user uses the same or different carriers.

When the aforementioned trends are considered, if various small cells are deployed, users become more physically closer to a network. Hence, in an enhanced 5G wireless access network, it is anticipated that communication will be performed not based on a cell of a legacy base station but based on a user-centered virtual zone. Moreover, in order to realize the communication based on the user-centered virtual zone, it is necessary to draw a service provision unit differentiated from a legacy cell-based service provision unit. In particular, it is necessary to draw and solve technical issues capable of implementing such a service provision unit as a user-centered zone and the service provision unit may cause a considerable change in a current wireless access network.

DISCLOSURE OF THE INVENTION

Technical Tasks

The present invention is designed to solve the aforementioned technical problem. An object of the present invention is to configure an uplink connection although a user equipment does not directly receive a downlink signal for obtaining uplink synchronization from an RRH.

Another object of the present invention is to actively configure an uplink connection of a user equipment in C-RAN environment in which a connection relationship between an RRH and a BBU is varying.

The other object of the present invention is to efficiently provide a service by asymmetrically configuring a downlink connection and an uplink connection by separating the downlink connection from the uplink connection.

The technical objects of the present invention will not be limited only to the objects described above. Accordingly, technical objects that have not been mentioned above or additional technical objects of the present application may be considered by those having ordinary skill in the art from the description presented below.

Technical Solution

To solve the problem above, a method of configuring an uplink transmission by a user equipment is proposed hereinbelow. Specifically, proposed herein is a method of configuring an uplink connection between a remote radio head (RRH) and a baseband unit (BBU), when the RRH and the BBU are separated from each other.

Advantageous Effects

According to the exemplary embodiments of the present invention, the following effects may be anticipated.

Firstly, since a user equipment is able to efficiently configure an uplink connection in environment in which an RRH and a BBU are separated from each other, it is able to provide a normal service although a channel situation between the user equipment and the RRH changes or power of the RRH is not sufficient.

Secondly, since it is able to separately configure a downlink connection and an uplink connection to a user equipment, it is able to provide optimized service capability to a user.

Thirdly, it is able to configure a stable uplink configuration to a user equipment although a connection relationship between an RRH and a BBU changes in C-RAN environment.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be devised by a person skilled in the art through the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements.

FIG. 8 is a flowchart for explaining a method of obtaining uplink synchronization associated with a further different embodiment of the present invention;

FIG. 9 is a flowchart for explaining a method of obtaining uplink synchronization associated with a further different embodiment of the present invention;

BEST MODE

Figure 1:
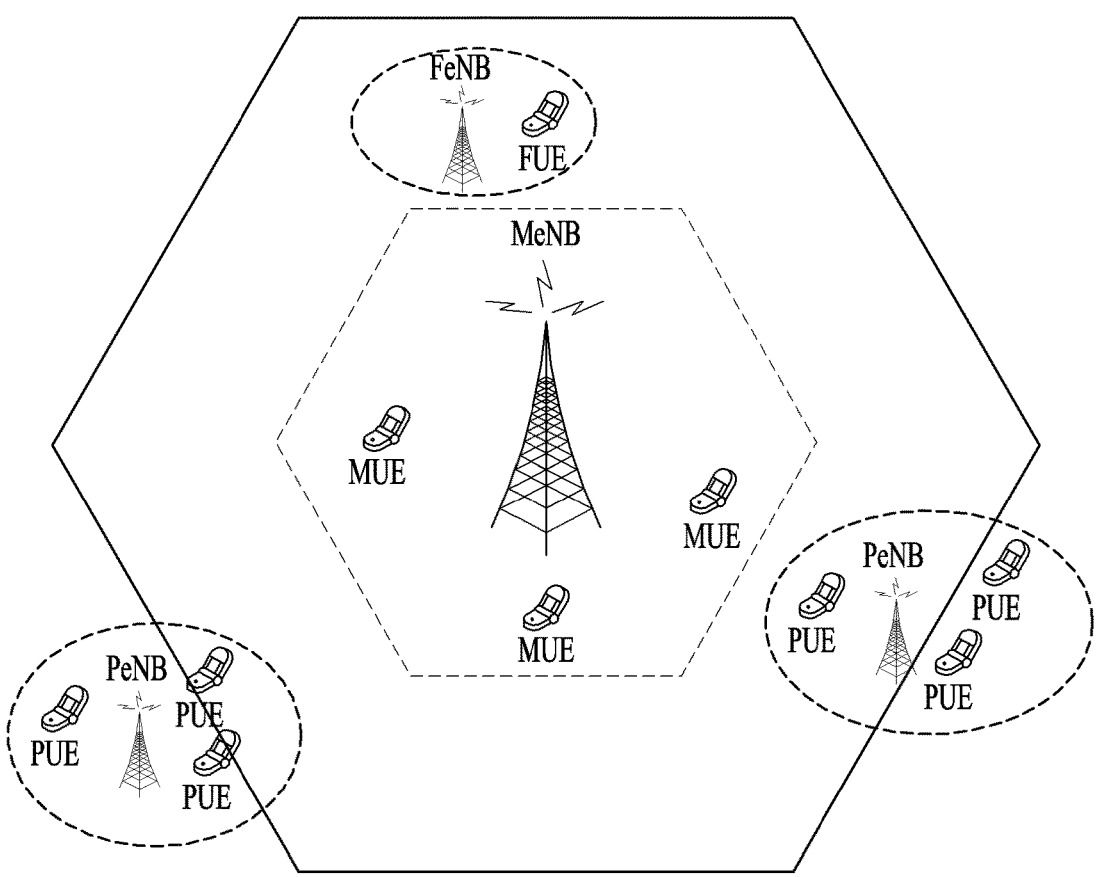
FIG. 1 is a diagram for a heterogeneous network environment associated with one embodiment of the present invention.

To achieve these and other advantages and in accordance with the purpose of the present invention, as embodied and broadly described, according to one embodiment, a method of configuring an uplink connection, which is configured by a user equipment with a BBU in a cloud radio access network (C-RAN) environment in which a remote radio head (RRH) and a baseband unit (BBU) are separated from each other, includes the steps of receiving a downlink signal from a plurality of RRHs, transmitting a random access preamble to a target RRH of which strength of the received downlink signal is equal to or greater than a threshold value among a plurality of the RRHs, receiving a random access response message for indicating to configure an uplink connection with an RRH which is selected based on a difference between reception power of the random access preamble received by the target RRH and reception power of the random access preamble overheard by a neighboring RRH adjacent to the target RRH, and configuring an uplink connection with the selected RRH.

The random access preamble transmitting step can transmit the random access preamble which is generated based on PRACH (physical random access channel) configuration information included in the downlink signal.

The PRACH configuration information can include at least one selected from the group consisting of information on a PRACH configuration index, information on a PRACH frequency offset and information on a root sequence index.

The random access response message indicates to connect with an RRH receiving the random access preamble with stronger power among the target RRH and the neighboring RRH and the random access response message can be received from a BBU to which the target RRH is mapped.

If the target RRH and the neighboring RRH are connected with a single BBU, the BBU compares the reception power of the random access preamble received by the target RRH and the reception power of the random access preamble received by the neighboring RRH with each other. If the target RRH and the neighboring RRH are connected with a first BBU and a second BBU, respectively, the first BBU and the second BBU can exchange and compare information on the random access preambles received by the target RRH and the neighboring RRH with each other.

If the target RRH and the neighboring RRH are connected with the first BBU and the second BBU, respectively, one of the first BBU and the second BBU can transmit an uplink connection request message for requesting to support the user equipment to another BBU among the first BBU and the second BBU through a connection with the selected RRH.

The method can further include the step of receiving information on a timing advance value between the selected RRH and the user equipment. In this case, the timing advance value can be calculated from a timing advance value between the user equipment and an RRH which is not the selected RRH among the target RRH and the neighboring RRH.

To further achieve these and other advantages and in accordance with the purpose of the present invention, according to a different embodiment, a user equipment configuring an uplink connection with a BBU in a cloud radio access network (C-RAN) environment in which a remote radio head (RRH) and a baseband unit (BBU) are separated from each other includes a transmitter, a receiver, and a processor configured to operate to configure an uplink connection in a manner of being connected with the transmitter and the receiver, the processor configured to control the receiver to receive a downlink signal from a plurality of RRHs, the processor configured to control the transmitter to transmit a random access preamble to a target RRH of which strength of the received downlink signal is equal to or greater than a threshold value among a plurality of the RRHs, the processor configured to control the receiver to receive a random access response message for indicating to configure an uplink connection with an RRH which is selected based on a difference between reception power of the random access preamble received by the target RRH and reception power of the random access preamble overheard by a neighboring RRH adjacent to the target RRH, the processor configured to configure an uplink connection with the selected RRH.

To further achieve these and other advantages and in accordance with the purpose of the present invention, according to a further different embodiment, a method of configuring an uplink connection, which is configured by a BBU with a user equipment in a cloud radio access network (C-RAN) environment in which a remote radio head (RRH) and a baseband unit (BBU) are separated from each other, includes the steps of receiving a first random access preamble transmitted by the user equipment through a target RRH, receiving a second random access preamble delivered by a neighboring RRH adjacent to the target RRH by overhearing the first random access preamble, selecting an RRH to be connected with the user equipment from among the target RRH and the neighboring RRH based on a difference between reception power of the first random access preamble and reception power of the second random access preamble, and transmitting a random access response message for indicating to configure an uplink connection with the selected RRH to the user equipment.

If both the target RRH and the neighboring RRH are connected with the BBU, the BBU compares the reception power of the first random access preamble and the reception power of the second random access preamble with each other. If the target RRH and the neighboring RRH are connected with the BBU and a different BBU, respectively, the BBU receives information on the second random access preamble received by the different BBU and can compare the information with the reception power of the first random access preamble.

If the target RRH and the neighboring RRH are connected with the BBU and a different BBU, respectively, the BBU can transmit an uplink connection request message for requesting to support the user equipment to the different BBU through an connection with the selected RRH.

To further achieve these and other advantages and in accordance with the purpose of the present invention, according to a further different embodiment, a BBU configuring an uplink connection with a user equipment in a cloud radio access network (C-RAN) environment in which a remote radio head (RRH) and a baseband unit (BBU) are separated from each other can include a transmitter, a receiver, and a processor configured to operate to configure an uplink connection in a manner of being connected with the transmitter and the receiver, the processor configured to control the receiver to receive a first random access preamble transmitted by the user equipment through a target RRH and a second random access preamble delivered by a neighboring RRH adjacent to the target RRH by overhearing the first random access preamble, the processor configured to select an RRH to be connected with the user equipment from among the target RRH and the neighboring RRH based on a difference between reception power of the first random access preamble and reception power of the second random access preamble, the processor configured to control the transmitter to transmit a random access response message for indicating to configure an uplink connection with the selected RRH to the user equipment.

MODE FOR INVENTION

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Environment

FIG. 1 is a diagram for a heterogeneous network environment associated with one embodiment of the present invention.

To guarantee a more stable data service such as multimedia service in future-generation mobile communication, much attention has been attracted to a hierarchical cell structure or heterogeneous cell structure in which small cells (e.g., pico cells or femto cells) for low power/near field communication are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each of a plurality of the small cells serves corresponding UEs by resource allocation based on a cell coordination scheme. As one of core technologies for implementing the aforementioned heterogeneous network environment, it may be able to separately implement an RRU (remote radio unit) and a BBU (baseband unit).

2. Cloud RAN Environment in which RRU and BBU are Separated from Each Other

Figure 2:
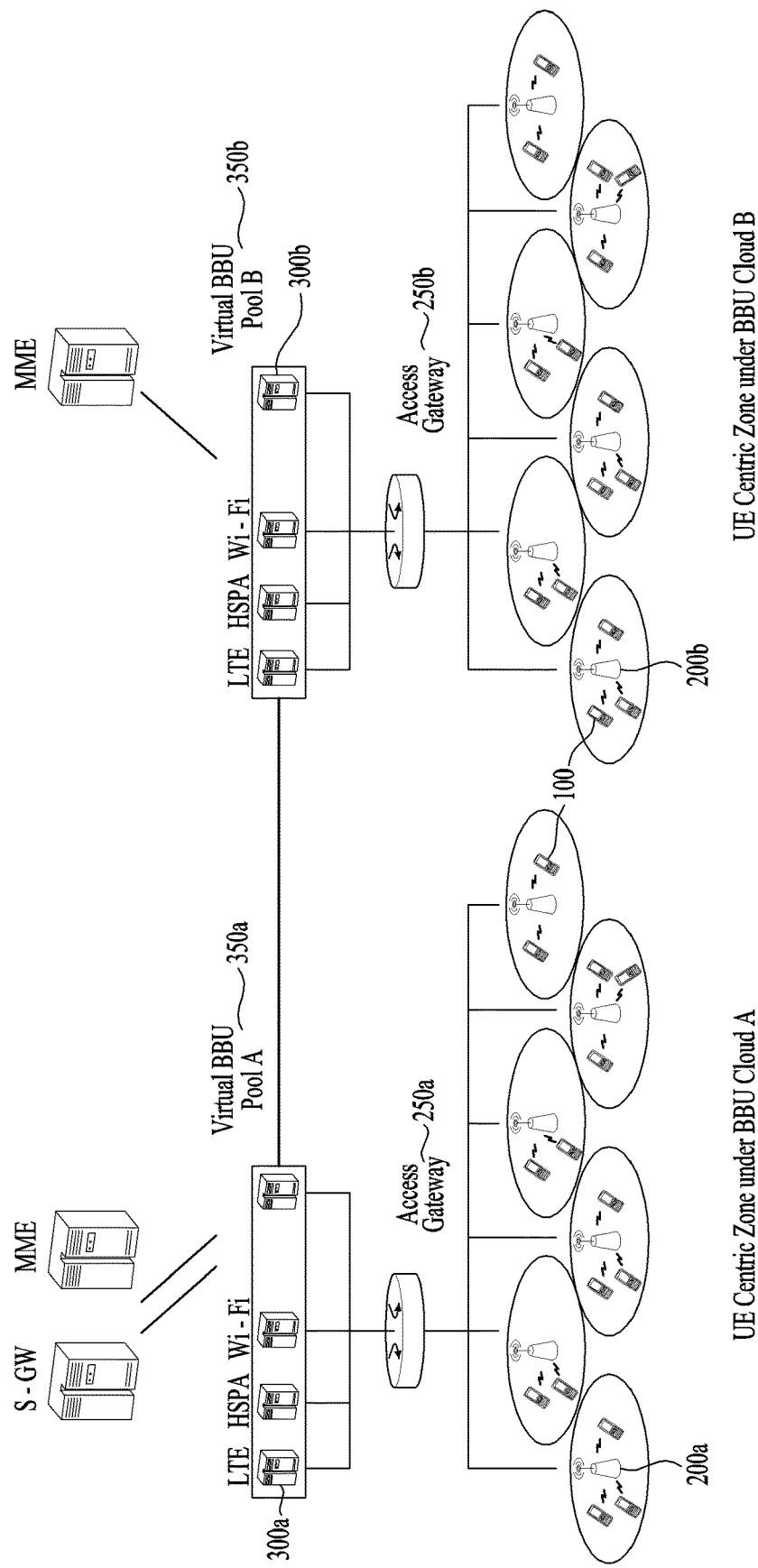
FIG. 2 is a diagram for a cloud RAN environment associated with one embodiment of the present invention.

FIG. 2 is a diagram for a cloud RAN (C-RAN) environment associated with one embodiment of the present invention. The cloud RAN environment can consist of a plurality of RRUs 200a/200b, a software-based virtual BBU pool 350a/350b or a virtual base station (VBS) and an access control/resource management/authentication server controlling the same and the like. Since elements of a core network change into an open IP network in the cloud RAN environment, many elements of the cloud RAN are directly interlocked with the elements of the core network in an organic relation.

Meanwhile, as an example of implementing the cloud RAN environment, as mentioned in the foregoing description, there may exist environment in which RRUs 200a/200b and BBUs 300a/300b are separated from each other. According to the separation of the RRUs and the BBUs, it may be able to compose cloud RAN environment including characteristics described in the following.

Firstly, a virtual BBU pool 350a/350b exists and includes a plurality of BBUs 300a/300b. The virtual BBU pool 350a/350b has a structure of being associated with SAS (shared antenna system) RRUs 200a/200b supporting Multi-RAT (multi-radio access technology) through an access gateway 250a/250b. The virtual BBU pool 350a/350b includes a plurality of BBUs 300a/300b supporting various wireless access technologies and one RRU 200a/200b can be associated with one or more BBUs 300a/300b. On the contrary, one BBU 300a/300b can be associated with one or more RRUs 200a/200b. BBUs 300a/300b belonging to the virtual BBU pool 350a/350b can be connected with the RRUs 200a/200b via an ideal/non-ideal backhaul and one virtual BBU pool 350a can be connected with another virtual BBU pool 350b via X2 interface or an interface similar to the X2 interface.

Secondly, all RRUs 200a/200b belonging to the virtual BBU pool 350a/350b have an identical virtual cell ID and all BBUs 300a/300b and all RRUs 200a/200b belonging to the virtual BBU pool 350a/350b are connected with each other via an ideal backhaul. An RRU 200a/200b is controlled by a BBU 300a/300b associated with the RRU.

Thirdly, a synchronization signal used for obtaining downlink synchronization is transmitted by each of the RRUs 200a/200b and the synchronization signal can be transmitted in a manner of including not only a virtual cell ID capable of representing the virtual BBU pool 350a/350b to which the RRUs 200a/200b belong thereto but also an RRU ID capable of representing each of the RRUs 200a/200b.

Fourthly, each of the RRUs 200a/200b assumes a simple antenna and L1/L2/L3 layer processing is processed by the BBUs 300a/300b belonging to the virtual BBU pool 350a/350b. And, the RRUs 200a/200b may have an attribute of SAS and it indicates that the RRUs 200a/200b may belong to another BBU from one BBU in the virtual BBU pool 350a/350b. In particular, time-variable belonging of the RRUs 200a/200b may change from one BBU to another BBU according to a situation (e.g., load of the BBUs, an available resource status, etc.) of the BBUs 300a/300b.

According to a legacy technology, there exists a physical cell and users receive a service by accessing the cell. Yet, as mentioned in the foregoing description, when an RRU and a BBU are implemented in a manner of being separated from each other, a network configures a zone capable of providing optimized communication environment in a user unit and provides a user with a zone-based service.

3. Method of Configuring Uplink (UL) Connection

Figure 3:
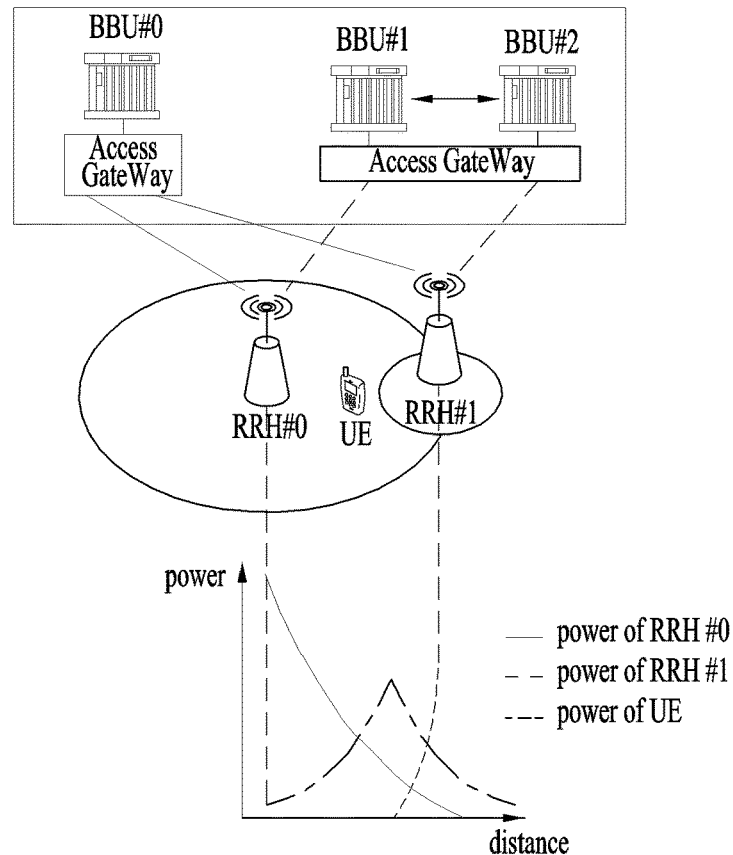
FIG. 3 is a diagram for explaining a method of obtaining uplink synchronization associated with one embodiment of the present invention.

FIG. 3 is a diagram for explaining a method of obtaining uplink synchronization associated with one embodiment of the present invention. In FIG. 3, an embodiment shown as a solid line between a BBU and an RRH corresponds to a case that a BBU #0 is connected with two RRHs, i.e., an RRH #0 and an RRH #1. In FIG. 3, an embodiment shown as a dotted line between a BBU and an RRH corresponds to a case that a BBU #1 and a BBU #2 are connected with an RRH #0 and an RRH #1, respectively.

In a legacy LTE/LTE-A system, a user equipment (UE) accesses a cell of which a downlink (DL) reception signal is strong and performs downlink and uplink communication through the cell. Yet, in a cell structure where a macro cell and a small cell coexist, there exists a difference between transmission power of the macro cell and transmission power of the small cell. In particular, since the transmission power of the macro cell is greater than the transmission power of the small cell in general, a UE adjacent to the small cell can receive a stronger downlink signal of the macro cell compared to a downlink signal of the small cell. In this case, the UE configures a downlink connection with the macro cell while an uplink (UL) connection is connected with the small cell corresponding to a cell of which a distance between the UE and a base station is shorter. As mentioned above, an asymmetrical connection between DL and UL is proposed as a method of increasing throughput of a service provided to the UE.

In C-RAN SAS environment, transmission power can be differently configure according to an RRH (specifically, transmission power according to each carrier). In this case, in order to enhance capability of a UE, the UE performs DL communication in a manner of being connected with an RRH of which strength of a DL reception signal is strong and performs UL communication in a manner of being connected with an RRH receiving a UL signal of the UE with greater strength.

As shown in FIG. 3, when an RRH #0 and an RRH #1 are adjacent to each other, transmission power of the RRH #0 and transmission power of the RRH #1 are different from each other. A UE is located at the inside of the coverage of the RRH #0 while being adjacent to the RRH #1. Although the UE is located at the inside of the coverage of the RRH #0, since a distance between the UE and the RRH #1 is shorter than a distance between the UE and the RRH #0, it might be advantageous to perform UL communication through the RRH #1 to enhance UL throughput of the UE. Or, it may also consider a following case. Although the UE is unable to receive a DL signal from the RRH #1 due to a poor DL channel status with the RRH #1, the UE may transmit a UL signal in a manner of being connected with the RRH #1 to enhance throughput.

As mentioned in the foregoing description, when the UE has an asymmetrical DL/UL connection to obtain a throughput gain, the UE should obtain synchronization of a UL connection prior to UL transmission. Hence, when the UE is unable to receive a DL signal from a specific RRH connected in DL, a method of obtaining UL synchronization for UL transmission is proposed in the following. Although contents described in the following are explained with an example of a C-RAN SAS situation, the present invention may be non-limited by the contents. The present invention can be similarly or identically applied to various network environments in which a macro cell and a small cell coexist.

The aforementioned asymmetrical DL/UL connection relationship, i.e., a DL/UL split connection can be performed all the time to enhance communication performance or can be performed only when a specific condition is triggered. For example, if a UE performs measurement report on an RRH, the UE is able to obtain information on the RRH. The information on the RRH can be transmitted to a serving BBU through a serving RRH of the UE. The serving BBU of the UE is able to check whether or not there exist RRHs adjacent to the serving RRH of the UE and information on the RRHs based on a measurement report message received from the UE. The serving BBU of the UE is also able to know an A-GW that connects an RRH and a BBU or BBUs connected with the neighboring RRHs based on the measurement report message received from the UE.

In this case, among the RRHs adjacent to the serving RRH of the UE, if a difference between power values of random RRHs is equal to or greater than a threshold, it may become a trigger condition for the aforementioned DL/UL split connection. In particular, when a plurality of RRHs are connected with a single BBU, the single BBU is able to know information on DL transmission power of the RRHs and the BBU is able to determine DL/UL split connection when a difference of transmission power is equal to or greater than a threshold. Or, when RRHs are connected with two or more BBUs, it may be able to form an interface (X2 interface or X2-like interface) between the BBUs to exchange information on the RRHs with each other. In this case, the BBUs may utilize an X2 setup request message of legacy LTE/LTE-A via the aforementioned interface between the BBUs or add a field indicating information on transmission power to an eNB configuration update message to exchange the information on the RRHs with each other.

If transmission power of the RRHs received by the BBUs has a difference equal to or greater than a predetermined threshold value or a value determined according to a load status of a cell, each of the BBUs is able to know that it is necessary to perform DL/UL split connection between the RRHs and the UE according to the aforementioned information.

Meanwhile, when DL/UL split connection is set to a UE, a method of configuring PRACH (physical random access channel) of RRHs is explained in the following. A PRACH configuration procedure can be performed when the aforementioned trigger condition for the DL/UL split connection is satisfied. Or, the PRACH configuration procedure can be performed according to the determination of a network such as a BBU pool, a BBU, or the like. According to legacy LTE/LTE-A, information on a PRACH configuration is transmitted when X2 interface is setup between eNBs or the information is transmitted using 'served cell information field' of an eNB configuration update message. The information can be identically or similarly applied to C-RAN SAS environment. In addition to the information, information on an RRH connected with a BBU can be transceived between BBUs. In particular, if information on the aforementioned PRACH configuration is transceived between BBUs respectively connected with RRHs adjacent to each other, interference control between RRHs or a CoMP scheme can be efficiently applied.

In relation to a PRACH configuration method, first of all, it may be able to consider a case of using a same carrier in a plurality of RRHs. In particular, a resource for enabling a UE located within the coverage of the RRHs to transmit PRACH can be identically set to a plurality of the RRHs. In this case, a plurality of the RRHs configure the UE located within the coverage of the RRHs to use a different random access preamble.

Specifically, when a plurality of the RRHs supports the UE in a manner of being mapped to a specific BBU according to the aforementioned specific trigger condition or the network configuration, the BBU identically configures a resource to be applied to PRACH in a manner of configuring a PRACH configuration index for PRACH configuration to be identical to a PRACH frequency offset. Meanwhile, it may be able to utilize 64 random access preambles different from each other by differently configuring a root sequence index value. Or, it may be able to configure 32 random access preambles different from each other to be used while an identical root sequence index is used. In the following, for clarity, the present invention is explained based on an embodiment implemented by the former scheme.

Hence, although the PRACH, which is transmitted to each of the RRHs, uses a same resource, the RRHs can make random access preambles not to be collided with each other and the RRHs are able to know a RRH to which the PRACH received from the UE is transmitted.

An embodiment (case of connecting both an RRH #0 and an RRH #1 to a BBU #0) shown as a solid line in FIG. 3 is explained. If a difference between transmission power of the RRH #0 to the UE and transmission power of the RRH #1 is equal to or greater (or less) than a predetermined threshold value, the BBU #0 can determine to asymmetrically configure a DL/UL connection of the UE in a manner of splitting the DL/UL connection. In order to identically configure a PRACH resource of the RRH #0 and a PRACH resource of the RRH #1, the BBU #0 identically configures a PRACH configuration index and a PRACH frequency offset to '0' for the two RRHs. In addition, in order to differently configure random access preambles of the two RRHs, the BBU #0 can set a root sequence index for the RRH #0 and a root sequence index for the RRH #1 to '0' and '64', respectively.

Meanwhile, since transmission power of an RRH is dynamically modifiable, the BBU #0 can modify a PRACH configuration of a different RRH in accordance with a PRACH configuration of a specific RRH. In this case, if a PRACH configuration is modified in an RRH, a BBU informs a different RRH of modified system information. Having obtained the modified system information, the RRH transmits the system information in a manner of modifying the system information to inform a UE of the modification. Moreover, having obtained the modified system information, the RRH can transmit a system information modification message of a paging message to an idle UE.

Subsequently, an embodiment that a plurality of RRHs are respectively connected with a plurality of BBUs (case of connecting a BBU #1 and a BBU #2 to an RRH #0 and an RRH #1, respectively) shown as a dotted line in FIG. 3 is explained. Due to a trigger condition satisfied by a transmission power difference or a network configuration, each of the BBUs can configure a PRACH configuration index value for a specific carrier of an RRH connected with the BBU to be identical to a PRACH frequency offset. In particular, a BBU can identically allocate a resource for PRACH to an RRH operating in a manner of being mapped to the BBU.

In this case, a root sequence index is configured to identify PRACH transmitted by a UE without being collided with each other between UEs in consideration of a point that the UE is able to apply a contention-based scheme by selecting one from among 64 random access preambles. In other word, BBUs differently set a root sequence index to a connected RRH while identically setting a PRACH configuration index and a PRACH frequency offset to the connected RRH. When a specific BBU determines a PRACH configuration index, a PRACH frequency offset and a root sequence index, the specific BBU transmits the determined information to a different BBU (a BBU connected with an RRH adjacent to an RRH connected with the specific BBU) to inform the different BBU that PRACH configuration has changed.

Referring to the example shown in the drawing, if a difference between transmission power of an RRH #0 and transmission power of an RRH #1 is equal to or greater (or less) than a threshold, a BBU #1 determines to configure DL/UL connection of a UE to be split. Subsequently, the BBU #1 utilizes PRACH configuration information, which has been exchanged with a BBU #2 when an interface is formed with the BBU #2, before PRACH is set to the RRH #0 and the RRH #1. In particular, the BBU #1 identically sets a PRACH configuration index and a PRACH frequency offset, which are set to the RRH #1, to the RRH #0 with reference to the PRACH configuration information on the RRH #1 received from the BBU #2. And, in order to differently set a random access preamble to the RRH #0 and the RRH #1, the BBU #1 is able to set a root sequence index 0 and a root sequence index 64 to the RRH #0 and the RRH #1, respectively. In particular, the BBU #1 is able to differently set a random access preamble to the two RRHs while identically allocating a PRACH resource to the two RRHs.

Meanwhile, when the transmission power of the RRH #0 or the RRH #1 is dynamically changing, the BBU #1 can modify PRACH configuration values set to the RRH #0. Subsequently, the BBU #1 transmits the modified system information on the RRH #0 through SIB and may be able to inform an idle UE of whether or not the system information is changed through a paging message.

Meanwhile, unlike the aforementioned embodiment, when a plurality of RRHs use a different carrier or an identical carrier, a resource for transmitting a PRACH of a UE can be differently set to a plurality of the RRHs. In this case, random access preambles, which are to be used by UEs connected with a plurality of the RRHs, can be identically or differently configured.

Specifically, when each of a plurality of the RRHs performs communication with a UE while being connected with BBUs different from each other, the BBUs can differently set a PRACH configuration index of the RRHs and/or a PRACH frequency offset based on a trigger condition satisfying the aforementioned difference between transmission powers of the RRHs or a network configuration. Meanwhile, if the RRHs use carriers different from each other for PRACH, the PRACH configuration index and the PRACH frequency offset can be configured to be same (i.e., if a carrier is different from each other, although PRACH configuration values are identically configured, it is able to distinguish the PRACH configuration values from each other). In this case, since PRACH for a plurality of the RRHs is identifiable by an allocated resource, a root sequence index can be identically or differently configured.

Referring to the example shown in the drawing, in an embodiment shown as a solid line in FIG. 3 (case of connecting two RRHs to a BBU #0), if a trigger condition for transmission power of the two RRHs is satisfied, the BBU #0 determines to differently configure a PRACH resource of the RRH #0 and a PRACH resource of the RRH #1. In particular, the BBU #0 sets a PRACH configuration index 0 and a PRACH frequency offset 0 to the RRH #0 and sets a PRACH configuration index 1 and a PRACH frequency offset 0 to the RRH #1. And, in order to differently configure a random access preamble of the RRH #0 and the RRH #1, the BBU #0 can set a root sequence index 0 to the RRH #0 and set a root sequence 64 or 0 to the RRH #1. In particular, if PRACH resources of the two RRHs are differently configured, the BBU #0 can identically or differently configure an index value for a random access preamble.

Meanwhile, if transmission power of the RRH #0 changes according to a situation, the BBU #0 can modify not only a PRACH configuration of the RRH #0 of which the transmission power is changed but also a PRACH configuration of a different RRH. In this case, the BBU #0 transmits the modified system information to a UE connected with the RRH #1 through SIB and may be able to inform an idle UE of whether or not the system information is changed via a paging message.

In FIG. 3, an embodiment shown as a dotted line (case of connecting an RRH #0 and RRH #1 to a BBU #1 and a BBU #2, respectively) is explained in the following. Each of the BBUs can differently configure at least one of a PRACH configuration index and a PRACH frequency offset of RRHs connected to the BBU according to a trigger condition or a network configuration. In particular, each of the BBUs can configure the two RRHs to use a different resource for PRACH. In this case, as mentioned in the foregoing description, a root sequence index can be identically or differently configured.

And, each of the BBUs should reserve a PRACH resource to be used for the two RRHs. For example, in order to make the RRH #1 overhear a PRACH transmitted to the RRH #0, a resource identical to a PRACH resource of the RRH #0 should be reserved for the RRH #1. This can be identically applied to the RRH #0 as well.

The BBU #1 differently configures PRACH resources of the two RRHs and identically or differently configures a root sequence index. In this case, the BBU #1 can utilize a PRACH configuration value, which has been received from the BBU #2 when an interface is formed between the BBU #1 and the BBU #2. Subsequently, the BBU #1 informs the BBU #2 that the PRACH configuration value is modified and the BBU #1 is able to transmit the modified configuration value to the BBU #2. The aforementioned embodiment can be similarly applied to a situation that transmission power of the RRH #0 is dynamically changing.

PRACH configuration values according to the aforementioned PRACH configuration procedure can be transmitted to all UEs located at the inside of the coverage of a specific RRH or a UE to which DL/UL split connection is supported only. When an RRH transmits a PRACH configuration value to UEs to which DL/UL split connection is supported only, it is necessary for the RRH to include a PRACH configuration value for UEs of which DL/UL connection is not split in system information (e.g., SIB, etc.) as well.

Figure 4:
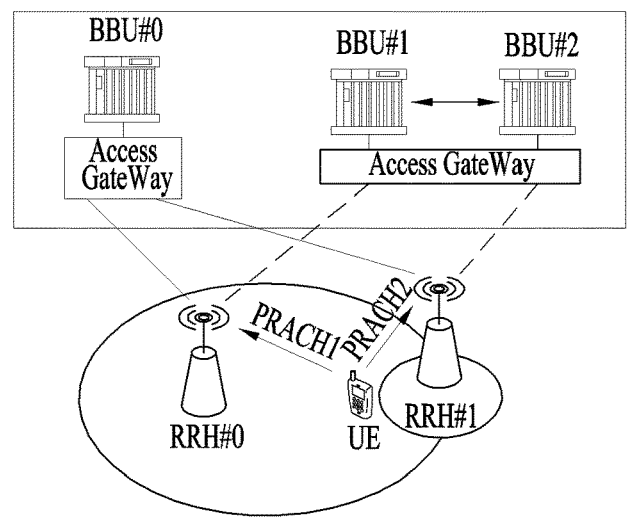
FIG. 4 is a diagram for explaining a method of obtaining uplink synchronization associated with a different embodiment of the present invention.

FIG. 4 is a diagram for explaining a method of obtaining uplink synchronization associated with a different embodiment of the present invention. In the following description, a method of obtaining UL synchronization even when a UE is unable to receive a DL signal is explained in succession to the aforementioned PRACH configuration procedure.

A UE transmits a PRACH to an RRH of which strength of a received DL signal is strong. In this case, the UE configures the PRACH based on PRACH configuration information included in system information, which is broadcasted by the RRH of which the strength of the DL signal is strong, and transmit the PRACH to the RRH.

If PRACH for an RRH #0 and PRACH for an RRH #1 are respectively configured as a PRACH 1 and a PRACH 2 according to the procedure mentioned earlier in FIG. 3, the RRH #1, which is positioned in the vicinity of the RRH #0, overhears a PRACH 1 signal transmitted to the RRH #0 by a UE. In the following, a connection relationship between a BBU and RRHs is explained in a manner of being divided into a case of being represented by a solid line and a case of being represented by a dotted line in FIG. 4.

First of all, when a connection relationship between a BBU and RRHs is represented by a solid line (two neighboring RRHs are connected with a BBU #0), each of the RRHs is already aware of PRACH resources configured for RRHs different from each other and information on a random access preamble. Hence, an RRH can overhear a PRACH transmitted to a different RRH by a UE and the RRH can transmit the PRACH received by overhearing to the BBU #0 connected with the RRH. In this case, in order to overhear a PRACH 1 transmitted to the RRH #0, the BBU #0 may not schedule DL transmission or UL reception of the RRH #1 for a resource of the PRACH 1 set to the RRH #0.

Meanwhile, the UE obtains system information from the RRH #0, which intends to configure a DL connection, and transmit a random access preamble to the RRH #0 via a higher layer signal in a manner of passing through a power adjustment procedure to make the RRH #0 receive the random access preamble with specific power. The BBU #0 measures reception power of the random access preamble transmitted to the RRH #0 and reception power of the random access preamble overheard by the RRH #1. If the random access preamble transmitted by the UE via the RRH #0 and the RRH #1 is delivered to the BBU #0, the BBU #0 is able to know that the UE has transmitted PRACH to the RRH #0 and strength of a DL signal transmitted to the UE from the RRH #0 is strongest (or, a DL channel status with the UE is best). Subsequently, the BBU #0 is able to know that the RRH #1 has overhead the PRACH transmitted to the RRH #0 by the UE.

This is because, as mentioned in the foregoing description, PRACH for each RRH is designated to be distinguished from each other via the PRACH configuration procedure. The BBU #0 measures signal strength of PRACH through the two received RRHs and determines to configure an RRH, which has received the PRACH transmitted by the UE with higher strength, as a UL connection with the UE. When the RRH receives the PRACH transmitted by the UE with higher strength, it may indicate that a distance from the UE is short or a UL channel status with the UE is good.

Figure 5:
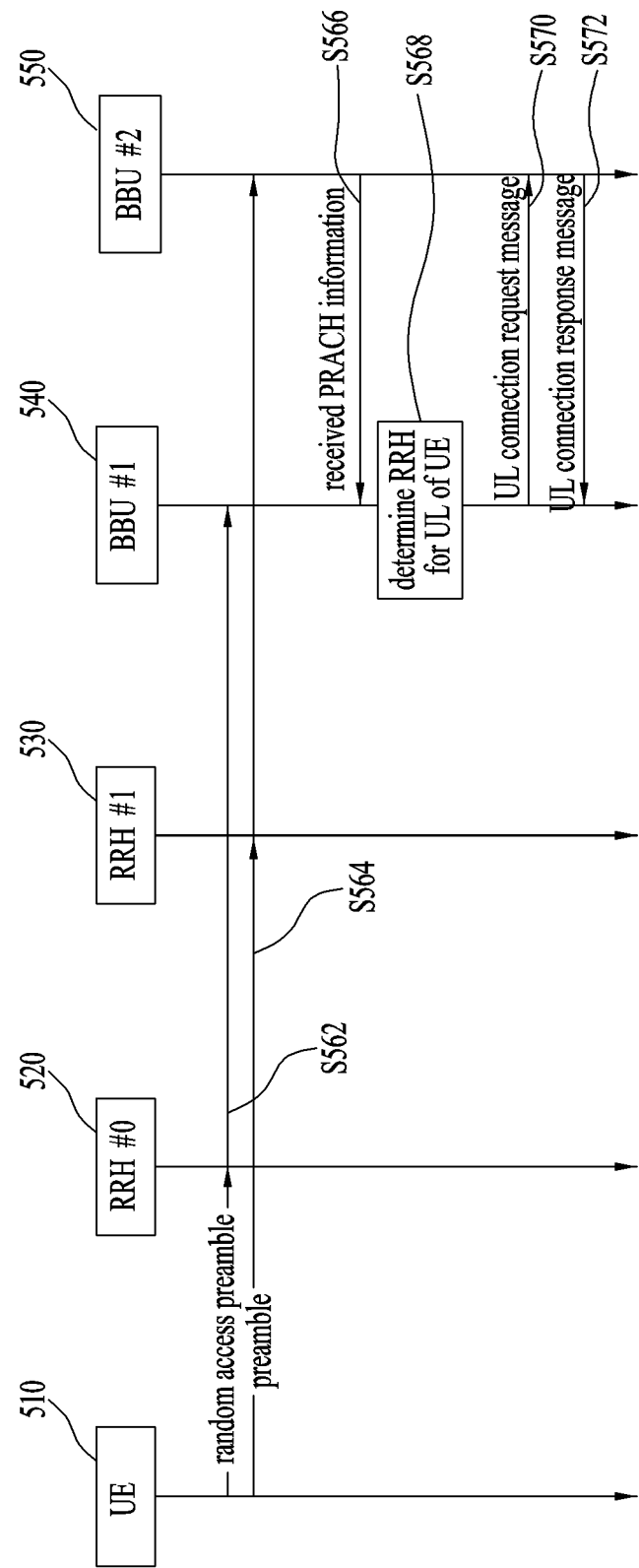
FIG. 5 is a flowchart for explaining a method of obtaining uplink synchronization associated with a further different embodiment of the present invention.

FIG. 5 is a flowchart for explaining a method of obtaining uplink synchronization associated with a further different embodiment of the present invention. In FIG. 5, the embodiment represented by a dotted line in FIG. 4 (case that the RRH #0 and the RRH #1 are connected with the BBU #1 and the BBU #2, respectively) is explained in more detail.

According to the aforementioned embodiment, the BBU #1 and the BBU #2 set a PRACH 1 and a PRACH 2 to the RRH #0 and the RRH #2, respectively. The UE obtains system information on an RRH of which strength of a DL signal received by the UE is strong from a BBU and transmits a PRACH to the RRH (e.g., RRH #0) with adjusted transmission power [S562]. If the UE transmits the PRACH 1 to the RRH #0, the UE can overhear not only the RRH #0 but also the RRH #1 adjacent to the RRH #0 [S564]. The RRH #0 and the RRH #1 transmit the PRACH received by the RRH #0 and the RRH #1 to the BBU #1 and the BBU #2, respectively.

Having respectively received the PRACH from the RRH #0 and the RRH #1, the BBU #1 and the BBU #2 are able to know that the PRACH transmitted by the UE is transmitted to the RRH #0. In this case, at least one selected from the group consisting of received random access preamble information (a preamble index, etc.), reception power received by each RRH, and an RRH ID (ID of an RRH which has overhead the PRACH of the UE) can be exchanged between the BBU #1 and the BBU #2. Or, the BBU #2 may transmit the information to the BBU #1 [S566]. Having received the information, the BBU #1 compares reception power of the PRACH transmitted to the RRH #0 by the UE and reception power of the PRACH overheard by the RRH #1 with each other and determines an RRH to be connected with the UE as UL [S568]. The BBU #1 can connect an RRH receiving a PRACH with stronger strength with the UE to enhance UL capability of the UE.

If the BBU #1 determines to connect the RRH #1 with the UE, a UL connection request message for requesting to support UL of the UE is transmitted to the BBU #2 [S570]. The UL connection request message can include at least one selected from the group consisting of a field indicating a message type, a field indicating a preamble index transmitted by the UE, a field indicating a target RRH ID (RRH #0) to which a preamble is transmitted, a field indicating an RRH ID (RRH #1) which has overhead a preamble, a field indicating a source BBU ID (BBU #1), and a field indicating a destination BBU ID (BBU #2). The UL connection request message can be transmitted through an interface (X2 interface or X2-like interface) between BBUs.

Having received the UL connection request message, the BBU #2 becomes aware that the BBU #2 supports UL of the UE. The BBU #2 transmits a UL connection response message to the BBU #1 to inform the BBU #1 that the BBU #2 has successfully received the UL connection request message [S572]. The UL connection response message can include at least one selected from the group consisting of a field indicating a message type, a field indicating a preamble index transmitted by the UE, a field indicating a target RRH ID (RRH #0) to which a preamble is transmitted, a field indicating an RRH ID (RRH #1) which has overhead a preamble, a field indicating a source BBU ID (BBU #2), and a field indicating a destination BBU ID (BBU #1). And, the UL connection response message can also include a field indicating information on a UL carrier used for the UE to perform UL communication with the RRH #1. The information on the UL carrier may include partial information (rach-ConfigCommon and prach-Config information can be omitted) among information transmitted via DL SIB2 in legacy LTE/LTE-A system. A concrete example of the information is shown in Table 1. And, the UL connection response message can also include scheduling information used for the UE to transmit an RRC connection request message to the RRH #1 and information on UL timing to the RRH #1.

TABLE 1

| | |
|---|---|
| freqInfo | SEQUENCE { |
| ul-CarrierFreq | ARFCN-ValueEUTRA |
| OPTIONAL, -- Need OP | |
| ul-Bandwidth | ENUMERATED {n6, n15, |
| n25, n50, n75, n100}OPTIONAL, | -- Need OP |
| additionalSpectrumEmission | AdditionalSpectrumEmission |
| }, | |
| RadioResourceConfigCommonSIB ::= | SEQUENCE { |
| rach-ConfigCommon | RACH-ConfigCommon, |
| prach-Config | PRACH-ConfigSIB, |
| pusch-ConfigCommon | PUSCH-ConfigCommon, |
| pucch-ConfigCommon | PUCCH-ConfigCommon, |
| soundingRS-UL-ConfigCommon | SoundingRS-UL-ConfigCommon, |
| uplinkPowerControlCommon | UplinkPowerControlCommon, |
| ul-CyclicPrefixLength | UL-CyclicPrefixLength, |
| ..., | |
| [[ uplinkPowerControlCommon-v1020 | |
| UplinkPowerControlCommon-v1020 | OPTIONAL -- Need OR |
| ]] | |
| } | |

Having received the UL connection response message, the BBU #1 recognizes that the BBU #2 has successfully received the UL connection request message and becomes aware that the BBU #2 will support UL of the UE. And, the BBU #1 is also able to know information on a carrier to be transmitted to the UE in relation to UL.

According to the above mentioned embodiments, although the UE does not directly receive a DL signal from an RRH, the UE is able to determine an RRH to configure a UL connection.

Figure 6:
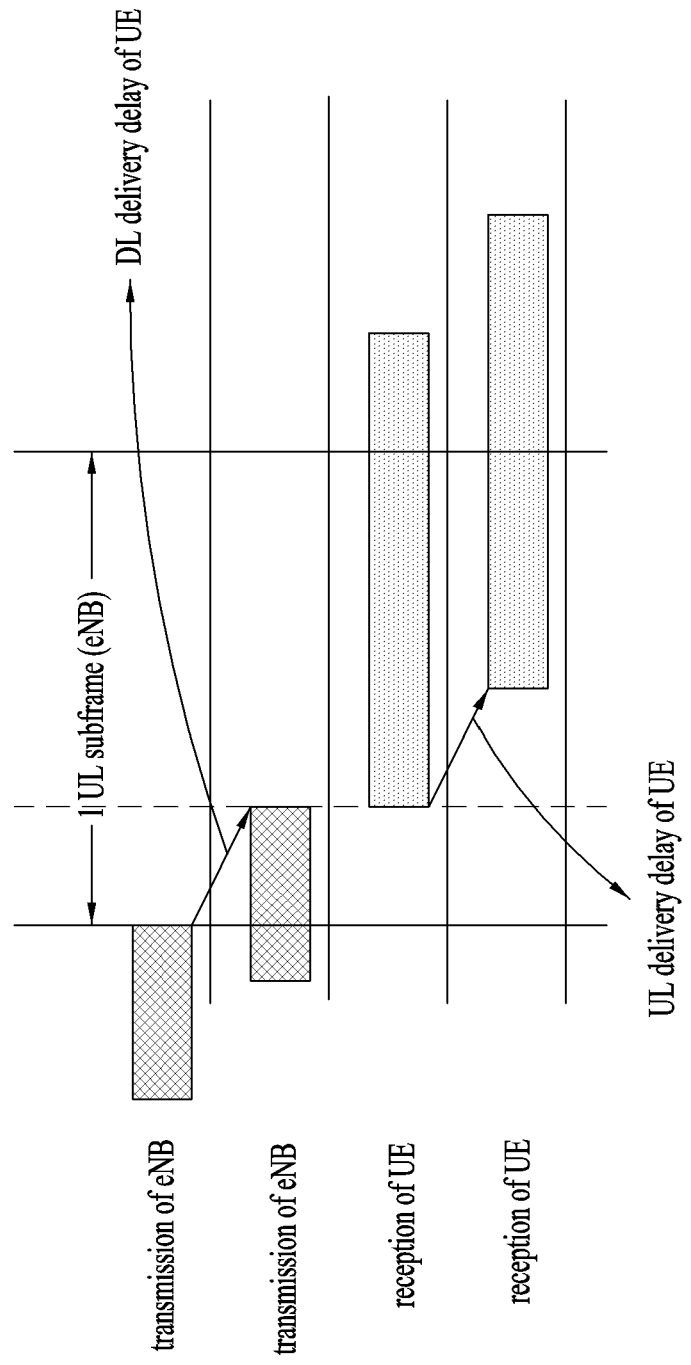
FIG. 6 is a diagram for explaining a method of obtaining uplink synchronization associated with a further different embodiment of the present invention.

In FIGS. 6 to 10, a method for a UE to configure a UL connection and obtain UL synchronization is explained. FIG. 6 is a diagram for explaining a method of obtaining uplink synchronization associated with a further different embodiment of the present invention. In FIG. 6, timing advance in legacy LTE/LTE-A system is explained.

In a legacy LTE/LTE-A system, an eNB transmits a DL signal to a UE. In this case, the DL signal is transmitted to the UE in a manner of passing through propagation delay according to a relative distance with the eNB. The UE can calculate appropriate DL reception timing in consideration of propagation delay using a DL synchronization signal. Subsequently, if initial UL transmission timing is not set to a UE, the UE performs an initial random access procedure to obtain UL transmission timing. The UE assumes UL transmission timing identical to DL reception timing (e.g., a DL subframe or a subframe boundary) and transmits a PRACH at an anticipated UL transmission timing. In this case, it may apply a predetermined offset value to the DL reception timing and the UL transmission timing. The PRACH transmitted by the UE is transmitted to the eNB in a manner of passing through propagation delay according to a distance between the UE and the eNB. The eNB receives the PRACH after the PRACH is passing through delay as much as time of which DL delivery delay and UL delivery delay are summed up. In this case, the eNB estimates total delay by detecting the PRACH, determines how to adjust the UL transmission timing of the UE and indicates the adjusted UL transmission timing to the UE. The adjusted transmission timing is referred to as a timing advance (TA).

Figure 7:
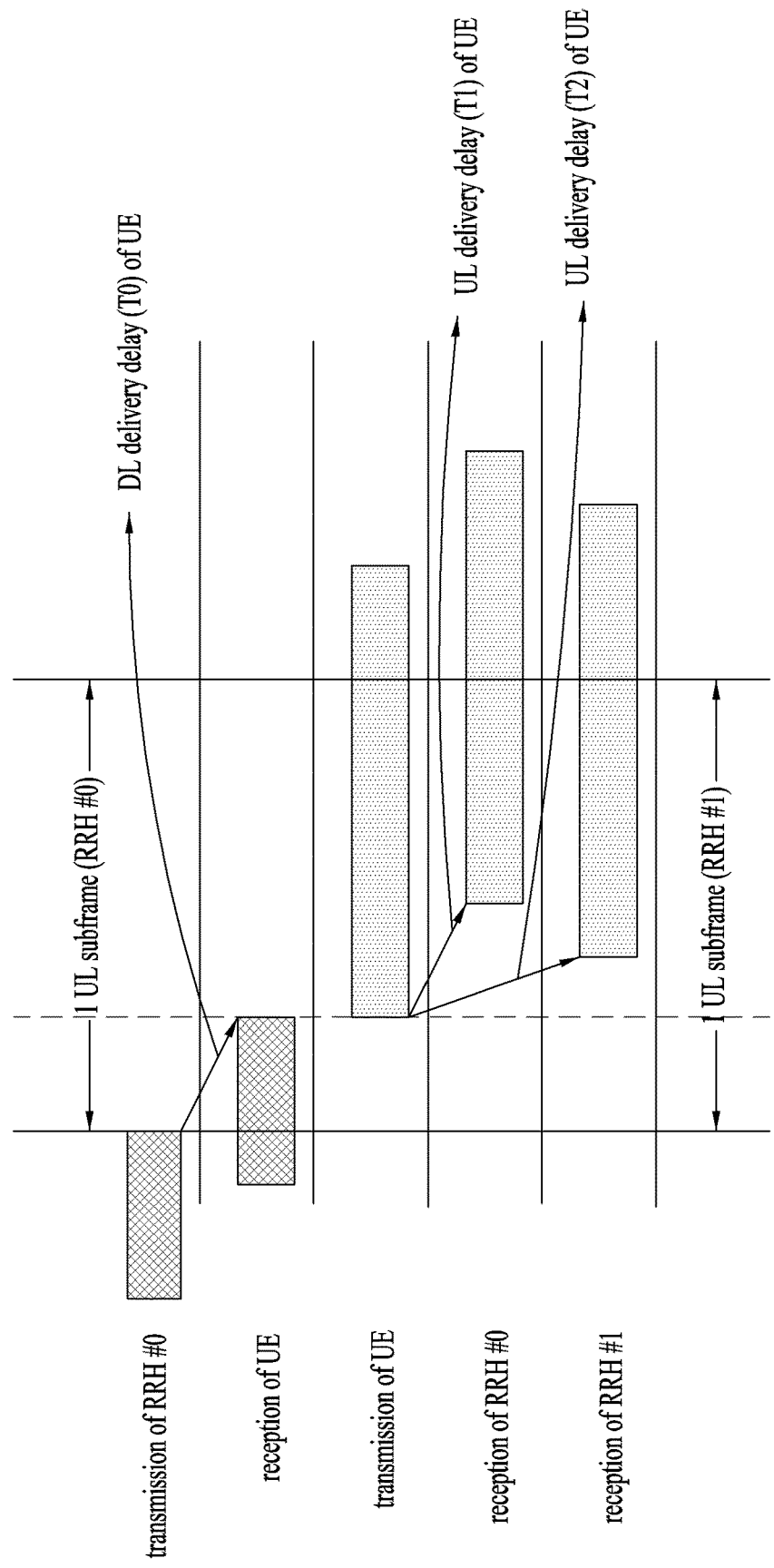
FIG. 7 is a diagram for explaining a method of obtaining uplink synchronization associated with a further different embodiment of the present invention.

FIGS. 7 to 10 are diagrams for explaining a method of obtaining uplink synchronization associated with a further different embodiment of the present invention. In FIG. 7, a timing advance in C-RAN environment is explained.

If a DL channel status between a UE and a specific RRH is poor in C-RAN environment, the UE is unable to receive a DL channel from the RRH and the UE is unable to match DL synchronization. Hence, a method of obtaining UL synchronization with the RRH when the UE fails to obtain DL synchronization is proposed in the following. In the following, a case that RRHs adjacent to the UE are synchronized with each other and a case that the RRHs are not synchronized with each other are explained.

First of all, a case that RRHs are synchronized with each other, i.e., a case that a network is synchronized is explained. If a UE transmits a PRACH to an RRH (e.g., RRH #0) of which strength of a DL signal is strong, a BBU connected with the target RRU estimates total propagation delay via the PRACH and calculates a TA of the UE.

FIG. 8 is a flowchart for explaining a method of obtaining uplink synchronization associated with a further different embodiment of the present invention.

As an example, a connection relationship (case of connecting an RRH #0 and an RRH #1 to a BBU #0) shown as a solid line in FIG. 4 is explained. First of all, the BBU #0 is able to calculate a TA with the RRH #0 corresponding to an RRH with which the UE is connected as (T0+T1)/2. If DL delivery delay (T0) between the UE and the RRH #0 can be approximated as being identical to UL delivery delay (T1), the BBU #0 can calculate UL delivery delay (T2) between the UE and the RRH #1 as well. A TA value between the UE and the RRH #1 calculated by the aforementioned procedure may become about T2.

After the TA between the RRH #1 and the UE is calculated, the BBU #0 schedules a random access response to the UE using PDCCH of a common search space consisting of RA-RNTI (random access radio network temporary ID) and the BBU #0 transmits a random access response message to the UE through PDSCH indicated by the PDCCH [S852]. In this case, the RA-RNTI can identically or similarly utilize a method used in a legacy LTE/LTE-A system and the UE performs blind decoding on the PDCCH using the RA-RNTI during a period of a specific window size.

The random access response message can include information on the RRH #1 connected with the UE in UL as well as information used to be transmitted in the legacy LTE/LTE-A system. The information on the RRH #1 can include at least one selected from the group consisting of information on a carrier frequency of the aforementioned RRH #1, information on a bandwidth, RRC SIB information related to uplink, information on the TA value to the RRH #1 (about T2), information on an RRH ID (RRH #1), information for indicating DL/UL split connection, information on C-RNTI, and information on an RA-preamble identifier.

And, the BBU #0 transmits an uplink grant to the UE to enable the UE to transmit an RRC connection request message to the RRH #1 using a C-RNTI value of the UE. The UE transmits UL data scheduled by the UL grant [S854].

Meanwhile, if signal strength of the PRACH, which is transmitted to the RRH #0 by the UE, is equal to or greater than a threshold value, the UE can also configure a UL connection to the RRH #0. In this case, the BBU #0 can transmit a message identical or similar to the random access response message mentioned earlier in FIG. 7 to the UE. Having received the random access response message, the UE becomes aware that the UE is to establish a UL connection with the RRH #0. Meanwhile, if a channel status between the RRH #0 and the UE is sufficiently good enough (if reception power of the random access preamble transmitted by the UE is equal to or greater than a threshold), the BBU #0 transmits a UL grant using C-RNTI of the UE to enable the UE to transmit an RRC connection request message to the RRH #0. In this case, unlike the aforementioned embodiment, the BBU #0 may not transmit a UL grant for enabling the UE to transmit an RRC connection request message to the RRH #1.

Subsequently, the UE transmits a random access preamble and performs blind decoding on PDCCH using RA-RNTI. If a scrambled DCI format is detected using the RA-RNTI, the UE can receive a random access response message transmitted on PDSCH using the DCI format. Having received the random access response message, the UE is able to know that UL and DL are configured to be connected with the RRH #1 in a manner of being separated. The UE obtains a TA value to the RRH #1 and becomes aware of timing of transmitting UL data to the RRH #1. And, the UE performs blind decoding on a search space of PDCCH received from the RRH #0 using C-RNTI (or, temporary C-RNTI). Subsequently, having received the UL grant, the UE transmits an RRC connection request message using a carrier of the RRH #1, which is transmitted via the random access response message defined according to the received UL grant.

Or, after the UE receives the random access response message from the RRH #0, the UE performs blind decoding on a search space of PDCCH, which is received from the RRH #1 during a period of a predetermined window size after specific time, using C-RNTI (or, temporary C-RNTI). Having received a UL grant on a carrier of the RRH #1, the UE transmits an RRC connection request message according to the received UL grant. Or, if an RRC connection is previously configured with the RRC #0, the UE can transmit an RRC connection re-establishment request message. The RRC connection request message and the RRC connection re-establishment request message can be implemented in an identical or similar form.

The aforementioned RRC connection request message can include information indicating DL/UL split connection, information on an ID of an RRH (RRH #0) to which a DL connection is to be configured by the UE, and information on an ID of an RRH (RRH #1) to which a UL connection is to be configured by the UE. The RRC connection request message can be transmitted at the timing which is determined using a TA value included in the random access response message received by the UE and resource configuration information. Having received the RRC connection request message, the RRH #1 delivers the message to the BBU #0 and the BBU #0 transmits an RRC connection setup message to the UE. In this case, the BBU #0 transmits a DL DCI format for RRC connection setup to the UE as a DL grant using C-RNTI (or temporary C-RNTI). Having received the RRC connection setup message, the UE can utilize the received C-RNTI (or temporary C-RNTI) as a post C-RNTI.

FIG. 9 is a flowchart for explaining a method of obtaining uplink synchronization associated with a further different embodiment of the present invention.

As an example, a connection relationship (case of connecting an RRH #0 and an RRH #1 to a BBU #1 and a BBU #2, respectively) shown as a dotted line in FIG. 4 is explained. Similar to FIG. 8, a case that synchronization is matched with each other between the two RRHs is explained in FIG. 9.

In an embodiment of FIG. 9, the UL connection response message [S572], which is transmitted to the BBU #1 by the BBU #2, can further include information on a TA between the RRH #1 and the UE which is calculated at the BBU #2. In succession to FIG. 5, the BBU #1 transmits a random access response message to the UE [S962] and may be then able to inform the BBU #2 of a C-RNTI (or temporary C-RNTI) value assigned to the UE by transmitting a UL information message to the BBU #2 [S964]. The BBU #2 can receive the RRC connection request message which is transmitted to the RRH #1 by the UE [S966].

The BBU #2 delivers the RRC connection request message transmitted by the UE to the BBU #1 [S968] and may be able to inform the BBU #1 of ID information (e.g., S-TMSI) of the UE included in the RRC connection request message. Having received the RRC connection request message, the BBU #1 is able to know that the UE to which the C-RNTI is assigned has transmitted the RRC connection request message. The BBU #1 configures UL resource-related information to be used by the UE and an SRB (signal radio bearer) dedicatedly used by the UE and transmits the UL resource-related information and the SRB to the UE in a manner of including the UL resource-related information and the SRB in an RRC connection setup message [S970]. And, the BBU #1 may inform the BBU #2 of information on a radio bearer assigned to the UE. Having received the RRC connection setup message, the UE is able to know that the random access procedure has been successfully performed. The UE continuously uses the C-RNTI and may be able to perform a following access procedure.

As mentioned in the foregoing description, when RRHs are connected with a single BBU and when RRHs are respectively connected with BBUs different from each other, the UE is able to know information on a carrier for performing UL connection with the RRH #1 in a manner of receiving a random access response message from a BBU. When the UE receives such UL carrier information as a frequency of a UL carrier, a bandwidth and a PRACH configuration value, if an RRC connection setup message is not received from the RRH #0 although the UE has transmitted an RRC connection request to the RRH #1, the UE may directly transmit a random access preamble to the RRH #1.

Or, in order for the UE to more accurately estimate a TA value with the RRH #1, the UE may perform a PRACH transmission procedure two times. In this case, although the UE is able to know a subframe synchronization gap between the RRH #0 and the RRH #1, the UE is unable to know an index of each subframe. Hence, in order for the UE to directly transmit a PRACH to the RRH #1, it is necessary for the UE to know information on a synchronization gap between the RRH #0 and the RRH #1. Hence, a random access response message, which is transmitted to the RRH #0 from the BBU #0 or the BBU #1, may include a subframe index of the RRH #1 at the time of including a subframe #0 index of the RRH #0. Or, the RRH #1 may inform the UE of a subframe index at the time of overhearing a preamble transmitted to the RRH #0 by the UE. Or, since the aforementioned timing-related information is also necessary for a BBU connected with two RRHs to designate (coordinate) a PRACH-related resource, it may be required to have a procedure of adjusting transmission timing of the two RRHs in advance.

In this case, when RRHs are respectively connected with BBUs different from each other, the BBU #2 connected with the RRH #1 can transmit a subframe index at the time of overhearing a random access preamble overheard by the RRH #1 via a UL connection response message. Having received the subframe index, the BBU #1 can transmit a random access response message to the UE to deliver the received information to the UE.

Figure 10:
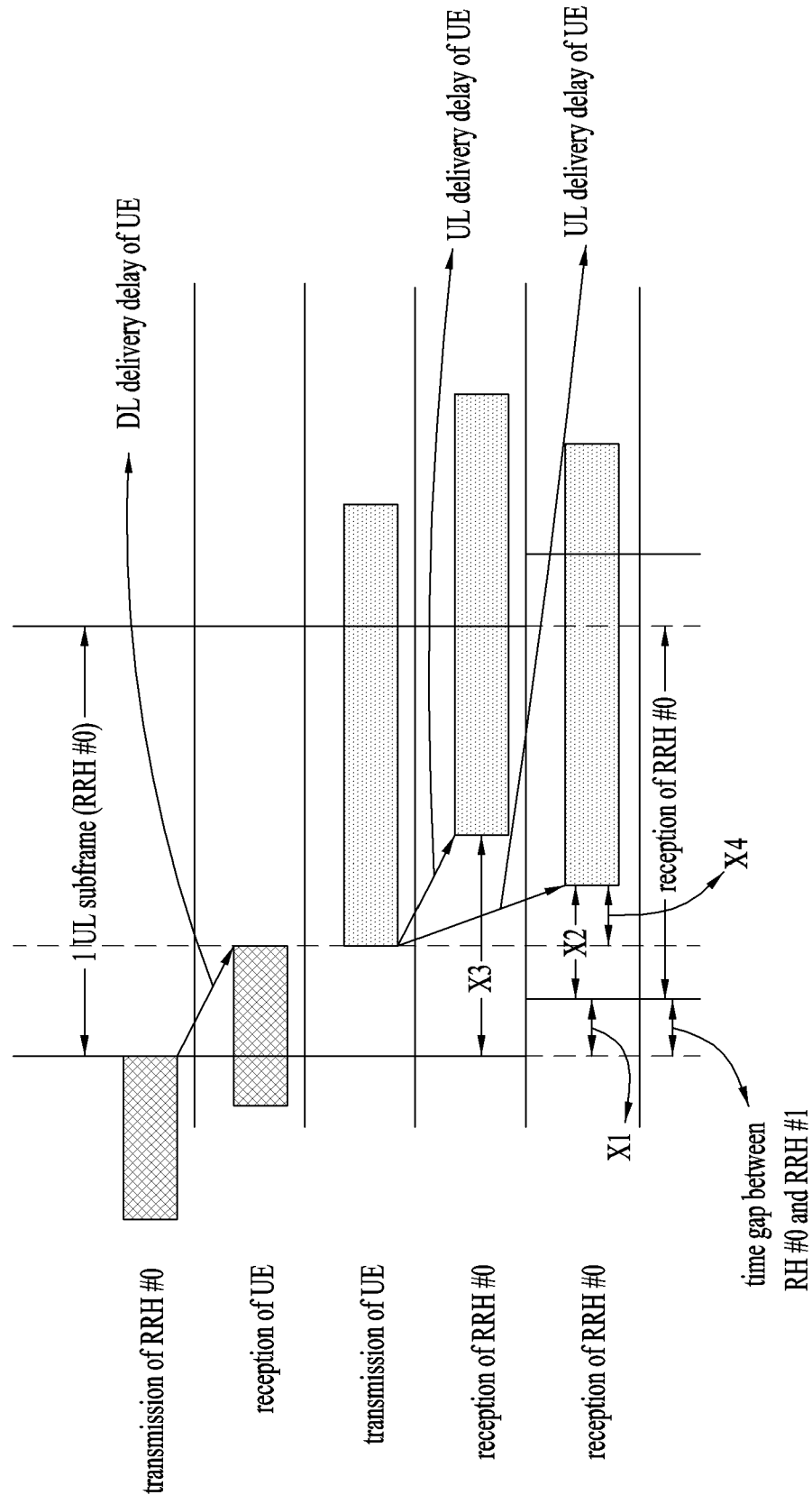
FIG. 10 is a diagram for explaining a method of obtaining uplink synchronization associated with a further different embodiment of the present invention.

FIG. 10 is a diagram for explaining a method of obtaining uplink synchronization associated with a further different embodiment of the present invention. Unlike the embodiments mentioned earlier in FIGS. 7 to 9, a case that synchronization is not matched with each other between RRHs is explained in FIG. 10. In an embodiment of FIG. 10, if synchronization is not matched with each other between RRHs, the aforementioned TA estimation method between the RRH #1 and the UE cannot be applied. In the following, a case of being represented as a solid line and a case of being represented as a dotted line are explained, respectively.

First of all, in case of a case shown as a solid line (case of connecting the RRH #0 and the RRH #1 to the BBU #0), a TA value between the RRH #1 and the UE can be calculated in a manner of subtracting a TA between the UE and the RRH #0 from time of overhearing a PRACH. Since the BBU #0 knows two values required for calculating the TA between the RRH #1 and the UE, the BBU #0 is able to easily calculate the TA between the RRH #1 and the UE. The calculated TA value is transmitted to the UE from the BBU #0 through the RRH #0. The procedures mentioned earlier in FIGS. 7 to 9 can be identically or similarly applied to a following random access procedure.

Secondly, in case of a case shown as a dotted line (case of connecting the RRH #0 and the RRH #1 to the BBU #1 and the BBU #2, respectively), a TA value between the RRH #1 and the UE can also be calculated in a manner of subtracting a TA between the UE and the RRH #0 from time of overhearing a PRACH. Yet, the BBU #2 is able to know a value of X2 shown in FIG. 10 only and the BBU #1 is able to know a value of X3 only. In the embodiment shown in the drawing, the TA value between the RRH #1 and the UE can be calculated as X4. In this case, the X4 can be calculated as "X4=X1+X2−(X3)/2". Hence, the BBU #1 can transmit X1 and X3 value to the BBU #2 or the BBU #2 can transmit X1 and X2 value to the BBU #1. In both cases, the BBU #1 or the BBU #2 is able to calculate the TA value between the RRH #1 and the UE. Meanwhile, a procedure for the BBU #1 to transmit the X1 and X3 value to the BBU #2 can be performed in a procedure that the BBU #1 transmits a UL connection request message to the BBU #2. If the BBU #1 transmits the X1 and the X3 to the BBU #2 and the BBU #2 calculates the TA value, the BBU #2 can transmit the calculated TA value to the BBU #1.

The calculated TA value can be transmitted to the BBU #1 in a manner of being included in a UL connection response message transmitted by the BBU #2. Having received the UL connection response message, the BBU #1 can transmit a random access response message to the UE in a manner of including the TA value in the random access response message. The procedures mentioned earlier in FIGS. 7 to 9 can be identically or similarly applied to a following random access procedure.

4. Device Configuration

Figure 11:
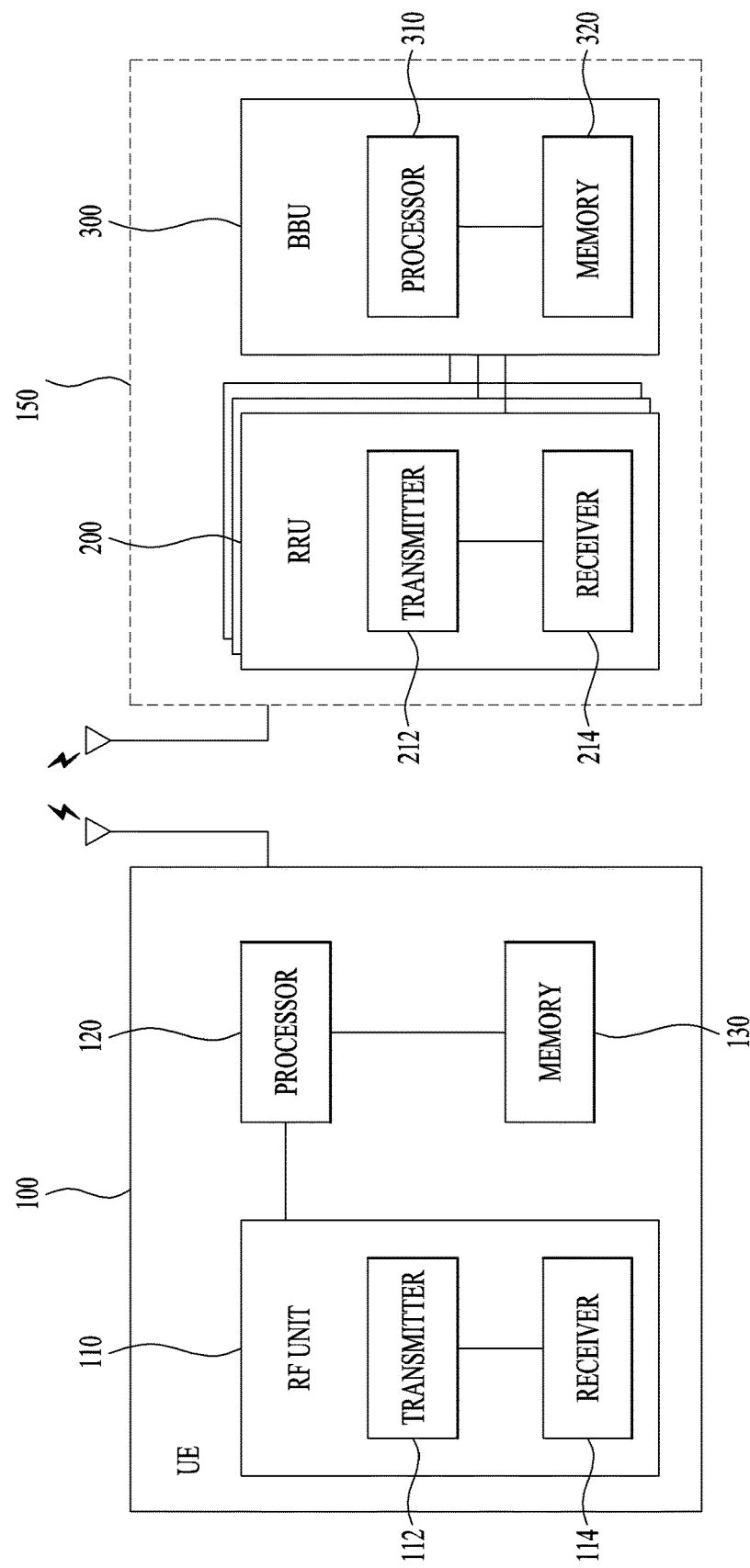
FIG. 11 is a block diagram for configurations of a user equipment, an RRH and a BBU associated with one embodiment of the present invention.

FIG. 11 is a block diagram illustrating configuration of a UE, an RRH and a BBU according to an embodiment of the present invention. While FIG. 11 illustrates a one-to-one communication environment between the UE 100 and the RRH 200, an environment in which multiple UEs and RRHs communicate with each other may also be created.

In FIG. 11, the UE 100 may include a radio frequency (RF) unit 110, a processor 120, and a memory 130. A conventional eNB 150 is implemented to include a transmitter 212, a receiver 214, a processor 310, and a memory 320. On the other hand, in a cloud RAN environment according to an embodiment of the present invention, the elements included in the eNB 150 are divided into the RRH 200 and the BBU 300.

Thereby, the RRH 200 serving as a simple antenna has only the transmitter 212 and the receiver 214. Overall communication operations including signal processing and layer processing are controlled by the processors 310 and the memory 320 included in the BBU 300. In addition, various types of connection including 1:1, 1:N, M:1 and M:N (M and N being natural numbers) may be established between the RRH 200 and the BBU 300.

The RF unit 110 included in the UE 100 may include a transmitter 112 and a receiver 114. The transmitter 112 and the receiver 114 are configured to transmit and receive signals to and from the RRH 200. The processor 120 may be functionally connected to the transmitter 112 and the receiver 114 to control a procedure in which the transmitter 112 and the receiver 114 transmit and receive signals to and from the RRH 200 and other devices. In addition, the processor 120 may apply various processing operations on a signal to be transmitted and then transmit the signal to the transmitter 112, and may process a signal received by the receiver 114.

When necessary, the processor 120 may store information contained in an exchanged message in the memory 130. The UE 100 configured as above may implement the methods of the various embodiments of the present invention described above.

The transmitter 212 and the receiver 214 of the RRH 200 are configured to transmit and receive signals to and from the UE 100. In addition, the processor 310 of the BBU 300 connected to the RRH 200 may be functionally connected to the transmitter 212 and the receiver 214 of the RRH 200 to control a procedure in which the transmitter 212 and the receiver 214 transmit and receive signals to and from other devices. In addition, the processor 310 may apply various processing operations on a signal to be transmitted and then transmit the signal to the transmitter 212, and may process a signal received by the receiver 214. When necessary, the processor 310 may store information contained in an exchanged message in the memory 320. The RRH 200 and the BBU 300 configured as above may implement the methods of the various embodiments described above.

The processors 120 and 310 of the UE 100 and the BBU 300 instruct (e.g., control, adjust, manage, and the like) operations in the UE 100, the RRH 200 and the BBU 300. The processors 120 and 310 may be connected to the corresponding memories 130 and 320 for storing program code and data. The memories 130 and 320 may be connected to the processors 120 and 310 and store an operating system, applications and general files.

The BBU 300 is connected with other BBUs to form a virtual BBU pool. Thereby, although not explicitly shown the figure, the BBU 300 may include a transceive module for connecting to other BBUs, separately from the RRH 200.

The processors 120 and 310 of the present invention may be referred to as controllers, microcontrollers, microprocessors, microcomputers, or the like. The processors 120 and 310 may be implemented by hardware, firmware, software, or a combination thereof. If an embodiment of the present invention is implemented using hardware, the processors 120 and 310 may be provided with ASICs (application specific integrated circuits) or DSPs (digital signal processors), DSPDs (digital signal processing devices), PLDs (programmable logic devices), and FPGAs (field programmable gate arrays) which are configured to implement the present invention.

The methods described above may be written as programs executable in a computer and implemented in general-purpose digital computers that execute the programs using a computer readable medium. In addition, the structure of the data used in the methods described above may be recorded in a computer readable medium using various means. Program storage devices storing executable computer code for implementing the various methods of the present invention should not be understood as including temporary objects such as carrier waves and signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for configuring an uplink connection by a user equipment (UE), with a baseband unit (BBU) in a cloud radio access network (C-RAN) environment in which a remote radio head (RRH) and the BBU are separated from each other, the method comprising:
    receiving a downlink signal from a plurality of RRHs;
    transmitting a random access preamble to a target RRH, wherein the target RRH is one of the plurality of RRHs, wherein the received downlink signal associated with the target RRH has a strength equal to or greater than a threshold value;
    receiving a random access response message, including information on an RRH, which is selected based on a difference between reception power of the random access preamble received by the target RRH and reception power of the random access preamble overheard by a neighboring RRH adjacent to the target RRH, and information on a timing advance value, between the selected RRH and the UE, via the target RRH,
    wherein the timing advance value is determined based on:
    a first value of a time gap between the target RRH and the selected RRH,
    a second value of a time gap between a subframe boundary of the target RRH and a reception start time of the random access preamble by the target RRH, and
    a third value of a time gap between a subframe boundary of the selected RRH and a reception start time of the random access preamble by the selected RRH; and
    configuring an uplink connection with the selected RRH based on the information on the timing advance value.

2. The method of claim 1, further comprising:
    generating the random access preamble based on physical random access channel (PRACH) configuration information contained in the downlink signal.

3. The method of claim 2, wherein the PRACH configuration information comprises at least one selected from the group consisting of information on a PRACH configuration index, information on a PRACH frequency offset and information on a root sequence index.

4. The method of claim 1,
    wherein the UE connects with the selected RRH based on an indication in the random access response message, and wherein the random access response message is received from another BBU to which the target RRH is mapped.

5. A user equipment (UE) configuring an uplink connection with a baseband unit (BBU) in a cloud radio access network (C-RAN) environment in which a remote radio head (RRH) and the BBU are separated from each other, the UE comprising:
    a transmitter;
    a receiver; and
    a processor, operatively connected to the transmitter and the receiver, wherein the processor is configured to:
    control the receiver to receive a downlink signal from a plurality of RRHs;
    control the transmitter to transmit a random access preamble to a target RRH, wherein the target RRH is one of the plurality of RRHs, and wherein of the received downlink signal associated with the target RRH has a strength equal to or greater than a threshold value;
    control the receiver to receive a random access response message, including
    information on an RRH, which is selected based on a difference between reception power of the random access preamble received by the target RRH and reception power of the random access preamble overheard by a neighboring RRH adjacent to the target RRH, and information on a timing advance value, between the selected RRH and the UE, via the target RRH,
    wherein the timing advance value is determined based on:
    a first value of a time gap between the target RRH and the selected RRH,
    a second value of a time gap between a subframe boundary of the target RRH and a reception start time of the random access preamble by the target RRH, and
    a third value of a time gap between a subframe boundary of the selected RRH and a reception start time of the random access preamble by the selected RRH; and
    configures an uplink connection with the selected RRH based on the information on the timing advance value.

6. A method of configuring an uplink connection, by a baseband unit (BBU), with a user equipment (UE) in a cloud radio access network (C-RAN) environment in which a remote radio head (RRH) and the BBU are separated from each other, the method comprising:
    receiving a first random access preamble transmitted by the UE through a target RRH;
    receiving a second random access preamble delivered by a neighboring RRH, adjacent to the target RRH, by overhearing the first random access preamble;

selecting an RRH, to be connected with the UE, among the target RRH and the neighboring RRH based on a difference between reception power of the first random access preamble and reception power of the second random access preamble; and transmitting, to the UE, a random access response message, including information on the selected RRH and information on a timing advance value between the selected RRH and the UE, via the target RRH, wherein the timing advance value is determined based on:

a first value of a time gap between the target RRH and the selected RRH, a second value of a time gap between a subframe boundary of the target RRH and a reception start time of the random access preamble by the target RRH, and a third value of a time gap between a subframe boundary of the selected RRH and a reception start time of the random access preamble by the selected RRH.

7. The method of claim 6, wherein when both the target RRH and the neighboring RRH are connected with the BBU, the BBU compares the reception power of the first random access preamble to the reception power of the second random access preamble, and wherein when the target RRH and the neighboring RRH are connected with the BBU and a different BBU, respectively, the BBU receives information on the second random access preamble received by the different BBU and compares the information with the reception power of the first random access preamble.

8. The method of claim 7, wherein when the target RRH and the neighboring RRH are connected with the BBU and the different BBU, respectively, the BBU transmits an uplink connection request message requesting support for the UE to the different BBU through a connection with the selected RRH.

9. A baseband unit (BBU) configuring an uplink connection with a user equipment (UE) in a cloud radio access network (C-RAN) environment in which a remote radio head (RRH) and the BBU are separated from each other, the BBU comprising:

a transmitter;

a receiver; and a processor, operatively connected to the transmitter and the receiver, wherein the processor is configured to:

control the receiver to receive a first random access preamble transmitted by the UE through a target RRH, and a second random access preamble delivered by a neighboring RRH adjacent to the target RRH by overhearing the first random access preamble;

select an RRH, to be connected with the UE, among the target RRH and the neighboring RRH based on a difference between reception power of the random access preamble and reception power of the second random access preamble; and control the transmitter to transmit, to the UE, a random access response message, including information on the selected RRH and information on a timing advance value between the selected RRH and the UE, via the target RRH, wherein the timing advance value is determined based on:

a first value of a time gap between the target RRH and the selected RRH, a second value of a time gap between a subframe boundary of the target RRH and a reception start time of the random access preamble by the target RRH, and a third value of a time gap between a subframe boundary of the selected RRH and a reception start time of the random access preamble by the selected RRH.

* * * * *